(12) United States Patent
Gutierrez et al.

(10) Patent No.: US 12,545,094 B2
(45) Date of Patent: Feb. 10, 2026

(54) METHODS AND SYSTEMS FOR MODIFYING VERTICAL POSITIONS OF POWERTRAINS OR COMPONENTS THEREOF

(71) Applicant: GM GLOBAL TECHNOLOGY OPERATIONS LLC, Detroit, MI (US)

(72) Inventors: Michael Andrew Gutierrez, Dearborn Heights, MI (US); Nathaniel Gerald Chaisson, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 85 days.

(21) Appl. No.: 18/436,067

(22) Filed: Feb. 8, 2024

(65) Prior Publication Data

US 2025/0256559 A1 Aug. 14, 2025

(51) Int. Cl.
*B60K 17/24* (2006.01)
*B60K 5/12* (2006.01)
*B60K 17/00* (2006.01)

(52) U.S. Cl.
CPC ............ *B60K 5/1283* (2013.01); *B60K 17/00* (2013.01)

(58) Field of Classification Search
None
See application file for complete search history.

(56) References Cited

U.S. PATENT DOCUMENTS

| 6,345,680 | B1 * | 2/2002 | Hill | B60K 17/24 180/209 |
| 6,490,540 | B1 * | 12/2002 | Kurzeja | G01C 1/00 702/151 |
| 6,758,302 | B2 * | 7/2004 | Penzotti | B60K 17/22 180/383 |
| 2008/0021620 | A1 | 1/2008 | Johansson et al. | |
| 2014/0151144 | A1 * | 6/2014 | Bouzit | B60K 17/24 180/379 |
| 2017/0182876 | A1 | 6/2017 | Wojno | |

FOREIGN PATENT DOCUMENTS

DE 102013225818 A1 6/2014

* cited by examiner

*Primary Examiner* — Jelani A Smith
(74) *Attorney, Agent, or Firm* — Ingrassia Fisher & Lorenz, LLP | IF&L

(57) ABSTRACT

Methods, systems, and vehicles including such system are provided. The systems include a vertical position movement mechanism configured to raise and lower a powertrain or a component thereof of the vehicle relative to a chassis of the vehicle, and a controller configured to, by one or more processors, modify a vertical position of the powertrain or the component thereof between a top and a bottom of the chassis with the vertical position movement mechanism to controllably adjust a first angle of a first joint at a first end of a drive shaft of the vehicle. The drive shaft functionally couples the powertrain and wheels of the vehicle to transfer rotational power from the powertrain to the wheels.

20 Claims, 6 Drawing Sheets

METHODS AND SYSTEMS FOR MODIFYING VERTICAL POSITIONS OF POWERTRAINS OR COMPONENTS THEREOF

INTRODUCTION

The technical field generally relates to vehicle drivetrains, and more particularly relates to a vehicle having a vertical position movement mechanism configured for raising and lowering a powertrain or component thereof to adjust an angle between the powertrain and wheels coupled thereto by a drive shaft.

A drivetrain of a vehicle typically includes a drive shaft (also referred to as a prop shaft, Cardan shaft, half-shaft, etc.) functionally coupling the transmission to the wheels, for example, directly to the wheels for front wheel drive vehicles or via an axle and a differential for rear wheel drive vehicles. As the engine produces power, the transmission transfers the power to the drive shaft which, in turn, transmits this rotational power to the wheels. As the vehicle travels over uneven terrain, the suspension system allows the wheels to move relative to the transmission. Therefore, the drive shaft includes joints at each of the ends thereof, such as universal joints (U-joints) or constant velocity joints (CV-joints), that are configured to accommodate for changes in angle and alignment between the transmission and the wheels (or the differential) to promote a continuous transfer of power from the engine to the wheels despite variations in the relative positions therebetween. However, when these joints are positioned at angles other than their optimum baseline angles, the joints may experience an increase in fatigue which may reduce their operational lifespan. In addition, the vehicle may experience increases in vibrations and noise.

Accordingly, it is desirable to provide systems and methods capable of promoting efficient operation of vehicle drivetrains. Furthermore, other desirable features and characteristics of the present disclosure will become apparent from the subsequent detailed description and the appended claims, taken in conjunction with the accompanying drawings and the foregoing introduction.

SUMMARY

A method is provided for adjusting one or more angles associated with a drive shaft of a vehicle. In one example, the method includes modifying, with a vertical position movement mechanism of a vehicle, a vertical position of a powertrain or component thereof of the vehicle between a top and a bottom of the vehicle to adjust a first angle of a first joint at a first end of a drive shaft of the vehicle. The drive shaft functionally couples the powertrain and wheels of the vehicle to transfer rotational power from the powertrain to the wheels.

A system is provided for a vehicle. In one example, the system includes a vertical position movement mechanism configured to raise and lower a powertrain or a component thereof of the vehicle relative to a chassis of the vehicle, and a controller configured to, by one or more processors, modify a vertical position of the powertrain or the component thereof between a top and a bottom of the chassis with the vertical position movement mechanism to controllably adjust a first angle of a first joint at a first end of a drive shaft of the vehicle. The drive shaft functionally couples the powertrain and wheels of the vehicle to transfer rotational power from the powertrain to the wheels.

A vehicle is provided that, in one example, includes a chassis, wheels, a suspension system coupling the wheels to the chassis and configured to provide for relative movement between the wheels and the chassis, a powertrain secured to the chassis and configured to generate rotational power, and a drive shaft functionally coupling the powertrain and the wheels and configured to transmit the rotational power from the powertrain to the wheels to rotate the wheels and thereby propel the vehicle. The drive shaft is functionally coupled to the powertrain with a first joint and to the wheels with a second joint. The first joint and the second joint are configured to accommodate for changes in angle and alignment between the powertrain and the wheels or intermediate components therebetween to provide for continuous transfer of the rotational power from the powertrain to the wheels despite variations in vertical positions of the wheels relative to the powertrain. The vehicle includes a vertical position movement mechanism configured to raise and lower the powertrain or a component thereof relative to the chassis, and a controller configured to, by one or more processors, modify a vertical position of the powertrain or the component thereof between a top and a bottom of the chassis with the vertical position movement mechanism to controllably adjust a first angle of the first joint of the drive shaft.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Examples of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that examples of the present disclosure may be practiced in conjunction with any number of systems, and that the systems described herein is merely examples of the present disclosure.

For the sake of brevity, certain techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an example of the present disclosure.

Figure 1:
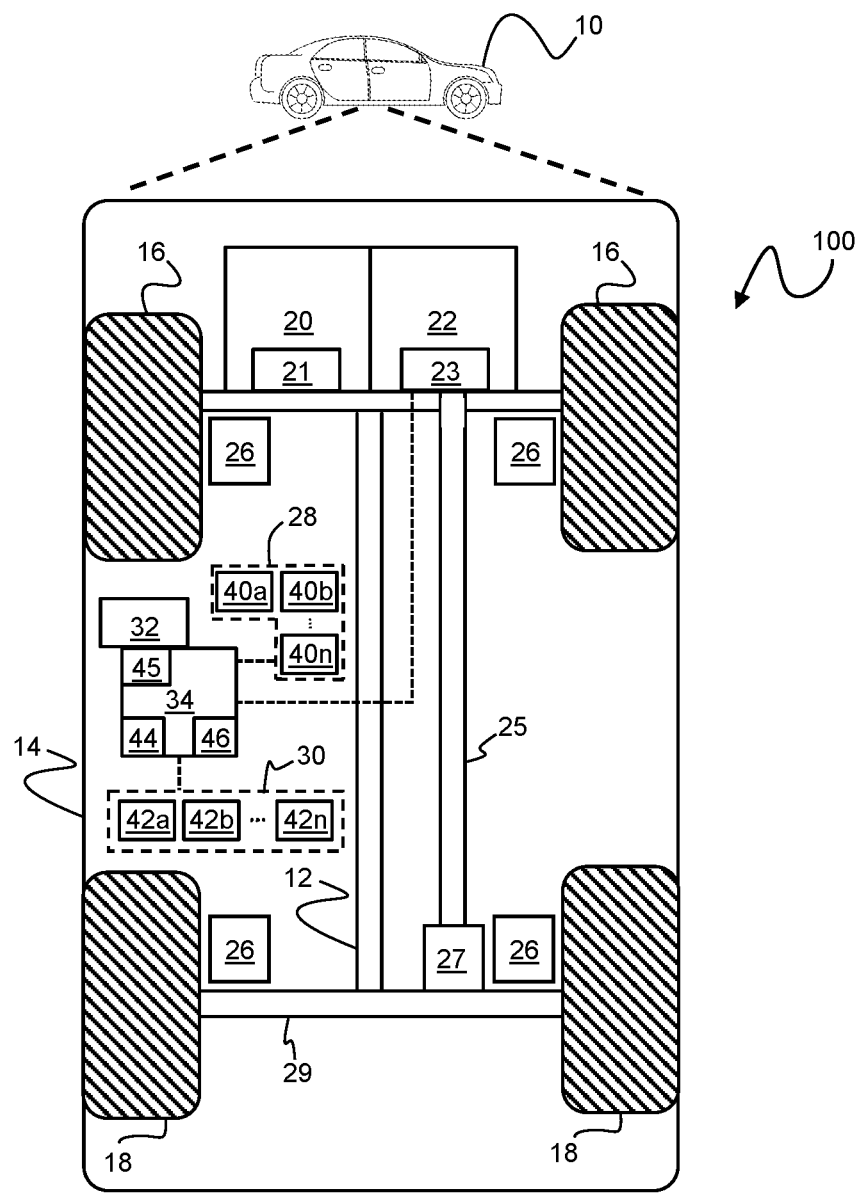
FIG. 1 is a functional block diagram of a vehicle having a powertrain vertical position management system in accordance with an example.

FIG. 1 illustrates a vehicle 10, according to an example. The vehicle 10 includes a powertrain vertical position management system 100 configured for modifying a vertical position of one or more components of a powertrain of the vehicle 10 to accommodate for variations in vertical positions of wheels of the vehicle 10.

In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

The vehicle 10 further includes a propulsion system 20, a transmission system 22, a suspension system 26, a sensor system 28, an actuator system 30, at least one data storage device 32, and at least one controller 34. The propulsion system 20 includes an engine and/or motor 21 such as an internal combustion engine (e.g., a gasoline or diesel fueled combustion engine), an electric motor (e.g., a 3-phase alternating current (AC) motor), or a hybrid system that includes more than one type of engine and/or motor. The transmission system 22 is configured to transmit power from the propulsion system 20 to the wheels 16-18 according to selectable speed ratios. According to various examples, the transmission system 22 may include a step-ratio automatic transmission, a continuously-variable transmission, or other appropriate transmission. In this example, the vehicle 10 is a rear wheel drive vehicle having the transmission system 22 functionally coupled to the rear wheels 18 by a drive shaft 25, a differential 27, and a rear axle 29 in a longitudinal mount arrangement. However, the vehicle 10 is not limited to rear wheel drive vehicles or to rear wheel drive vehicles having this particular arrangement. The suspension system 26 couples the wheels 16 and 18 to the chassis 12 and provides for relative motion therebetween to accommodate for uneven terrain. The suspension system 26 may include, for example, various springs, shock absorbers, and linkages.

The sensor system 28 includes one or more sensing devices 40a-40n that sense observable conditions of the exterior environment, the interior environment, and/or a status or condition of a corresponding component of the vehicle 10 and provide such condition and/or status to other systems of the vehicle 10, such as the controller 34. It should be understood that the vehicle 10 may include any number of the sensing devices 40a-40n. The sensing devices 40a-40n can include, but are not limited to, current sensors, voltage sensors, temperature sensors, motor speed sensors, position sensors, etc.

The actuator system 30 includes one or more actuator devices 42a-42n that control one or more vehicle features such as, but not limited to, the propulsion system 20 and/or the transmission system 22.

The data storage device 32 stores data for use in controlling the vehicle 10 and/or systems and components thereof. As can be appreciated, the data storage device 32 may be part of the controller 34, separate from the controller 34, or part of the controller 34 and part of a separate system. The storage device 32 can be any suitable type of storage apparatus, including various different types of direct access storage and/or other memory devices. In one example, the storage device 32 comprises a program product from which a computer readable memory device can receive a program that executes one or more examples of one or more processes of the present disclosure, such as the steps of the process discussed further below in connection with FIGS. 7 and 8. In another example, the program product may be directly stored in and/or otherwise accessed by the memory device and/or one or more other disks and/or other memory devices.

The controller 34 includes at least one processor 44, a communication bus 45, and a computer readable storage device or media 46. The processor 44 performs the computation and control functions of the controller 34. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms, and generate data based on the logic, calculations, methods, and/or algorithms. Although only one controller 34 is shown in FIG. 1, examples of the vehicle 10 can include any number of controllers 34 that communicate over any suitable communication medium or a combination of communication mediums and that cooperate to process the sensor signals, perform logic, calculations, methods, and/or algorithms, and generate data.

As can be appreciated, that the controller 34 may otherwise differ from the example depicted in FIG. 1. For example, the controller 34 may be coupled to or may otherwise utilize one or more remote computer systems and/or other control systems, for example as part of one or more of the above-identified vehicle devices and systems. It will be appreciated that while this example is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain examples. It will similarly be appreciated that the computer system of the controller 34 may also otherwise differ from the example depicted in FIG. 1, for example in that the computer system of the controller 34 may be coupled to or may otherwise utilize one or more remote computer systems and/or other control systems.

As the propulsion system 20 produces power, the transmission system 22 transfers the power to the drive shaft 25 which, in turn, transmits this rotational power to the rear wheels 18. As the vehicle 10 travels over uneven terrain, the suspension system 26 allows the wheels 16 and 18 to move relative to the chassis 12, and therefore the transmission system 22. Therefore, the drive shaft 25 includes joints at each of the ends thereof, such as universal joints (U-joints) or constant velocity joints (CV-joints), that are configured to accommodate for changes in angle and alignment between the transmission system 22 and the rear wheels 18 or the differential 27 to promote a continuous transfer of power from the propulsion system 20 to the rear wheels 18 despite variations in the relative positions therebetween.

In some examples, a first joint is disposed at a first end of the drive shaft 25 that defines a first angle between the central, longitudinal axis of the drive shaft 25 and a central axis of an output shaft (not shown) of the transmission system 22, and a second joint disposed at a second end of the drive shaft 25 defines a second angle between the central, longitudinal axis of the drive shaft 25 and a central axis of an input shaft (not shown) of the differential 27. As used herein, the first angle and the second angle are disposed in a vertical plane that passes through the central, longitudinal axis of the drive shaft 25. The first and second angles are typically at respective baseline angles, and may deviate from these baseline angles during operation of the vehicle 10, such as when traveling over uneven terrain. In exemplary embodiments, the first and second angles are maintained within certain operating angle ranges as determined by the manufacturer. The baseline angles may vary between applications. In some examples, the baseline angles of the first and second angles may be substantially opposite angles with equal absolute values, for example, within three degrees (absolute value), such as within two degrees, such as within one degree. For example, the operating angle ranges may be 0 to −17 degrees for the first angle and 0 to 17 degrees for the second angle (e.g., for a universal joint), such as an angle range of 0 to −3 degrees for the first angle and 0 to 3 degrees for the second angle, and the baseline angles may be −0.5 degrees for the first angle and 0.5 degrees for the second angle, or vice versa.

As used herein, the powertrain refers to a combination of components configured to generate rotational power. In the example of FIG. 1, the powertrain includes at least the propulsion system 20 and the transmission system 22. As used herein, the drivetrain refers to a combination of components configured to transfer the rotational power from the powertrain to the rear wheels 18. In the example of FIG. 1, the drivetrain includes the drive shaft 25, the differential 27, and the rear axle 29.

The vehicle 10 includes a vertical position movement mechanism 23 that is configured to modify a vertical position of at least a portion of the powertrain of the vehicle 10 between a top and a bottom of the vehicle 10, for example, by allowing for at least a portion of the transmission system 22 to be raised and/or lowered relative to the chassis 12 and maintained in various vertical positions. As used herein, the bottom of the vehicle 10 refers to a lowermost portion of the vehicle 10 closest to a surface on which the wheels 16 and 18 contact (e.g., a road) and the top of the vehicle 10 refers to an uppermost portion of the vehicle 10 that is furthest from such surface. In some examples, the vertical position of the powertrain may be adjusted in response to or in anticipation of a change in vertical position of one or more components of the drivetrain, such as the rear wheels 18, the rear axle 29, the differential 27, and/or a rear end of the drive shaft 25.

By modifying the vertical position of the powertrain, adjustments can be made to the first and/or second angles of the joints of the drive shaft 25. This capability can be used to modify the performance of the vehicle 10, extend the operating lifespan of various components of the vehicle 10, and/or reduce noise and/or vibrations produced during operation of the vehicle 10.

In some examples, the vertical position movement mechanism 23 may be operated manually by a user via interaction with one or more user interfaces, operated automatically by the controller 34 in response to various events, such as the vehicle 10 switching from a first vehicle mode to a second vehicle mode, and/or operated automatically by the controller 34 in real-time to continuously or periodically accommodate for variations in the suspension, vertical position of the rear wheels 18, etc.

In various examples, the vehicle 10 may be capable of operating in more than one vehicle mode. For example, the user may select a specific vehicle mode by interaction with a user interface in accordance with a desired drive performance. In some examples, the vehicle 10 may automatically switch vehicle modes in response to certain conditions such as certain signals received from the sensor system 28 or from other systems of the vehicle 10. Nonlimiting examples of vehicle modes may include a lifted vehicle mode, a rapid acceleration mode, a high maneuverability mode, an optimized comfort mode, etc. In such examples, one or more of the vehicle modes may have different exemplary baseline angles for the joints of the drive shaft 25. Therefore, in response to the vehicle 10 switching from a first vehicle mode having, for example, a first baseline angle of the first joint to a second vehicle mode having a second baseline angle of the first joint, the controller 34 may be configured to modify the vertical position of the powertrain to adjust the first angle between the first baseline angle and the second baseline angle.

In various examples, the controller 34 may be configured to operate the vertical position movement mechanism 23 to automatically adjust the vertical position of the powertrain to accommodate for variations in positions of the rear wheels 18 or other components during propulsion of the vehicle 10. In some examples, the controller 34 may be configured to detect, via signals from one or more of the sensing devices 40a-40n, a change in vertical position of the rear wheels 18, the rear axle 29, the differential 27, or another component of the drivetrain, determine a change in a vertical position of one or more components of the powertrain intended to offset the change in the detected change in vertical position, and operate the vertical position movement mechanism 23 to automatically adjust the vertical position of the powertrain to implement the change in the vertical position of the one or more components of the powertrain.

In some examples, the controller 34 may be configured to determine a difference in a first absolute value of the first angle of the first joint and a second absolute value of the second angle of the second joint at the second end of the drive shaft 25, and operate the vertical position movement mechanism 23 to automatically adjust the vertical position of one or more components of the powertrain to reduce the difference between the first absolute value and the second absolute value. For example, if the controller 34 detects a change in the second angle from −0.5 to −1.0, the controller 34 may operate the vertical position movement mechanism 23 to change the vertical position of one or more components of the powertrain sufficient to change the first angle from 0.5 to 1.0 thereby reducing the absolute delta between the first and second angles from 0.5 to 0.

Figure 2:
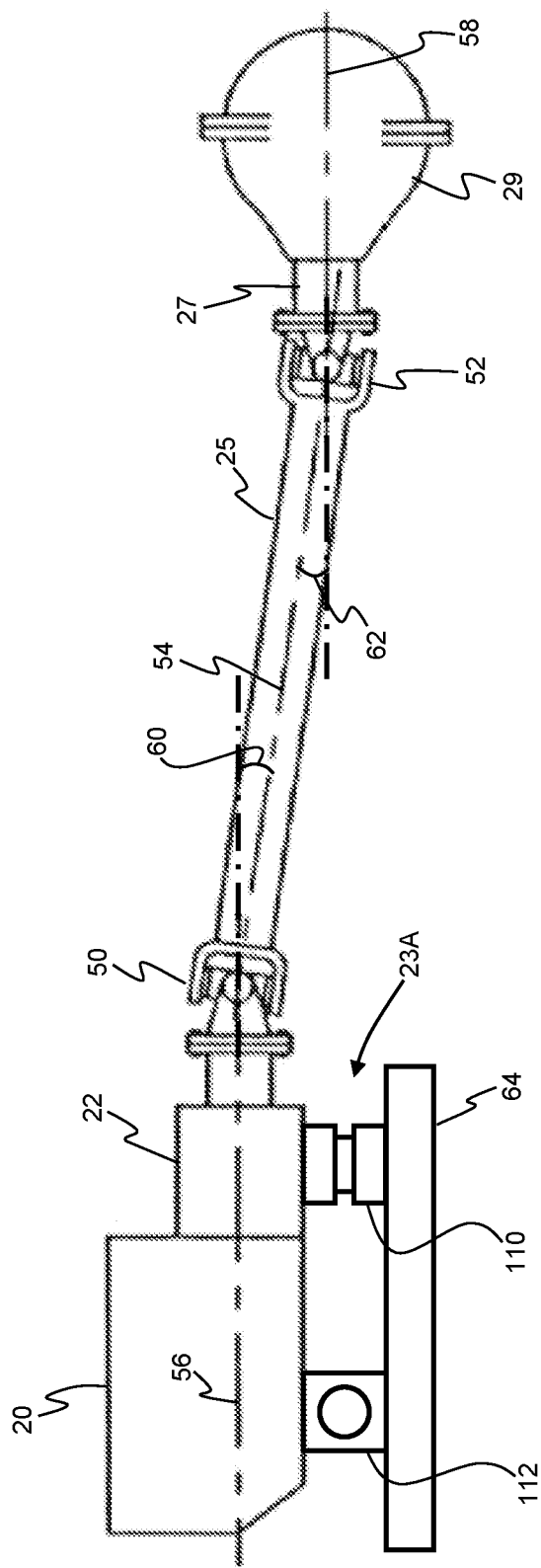
FIG. 2 is an isolated side view schematically representing a vertical position movement mechanism of the powertrain vertical position management system of FIG. 1 in accordance with an example.

The vertical position movement mechanism 23 may include various components and structures configured to raise and/or lower one or more components of the powertrain of the vehicle 10. Referring now to FIG. 2, and with continued reference to FIG. 1, a first example of a vertical position movement mechanism 23A is provided. In this example, the vertical position movement mechanism 23A may include one or more actuators 110 (e.g., linear actuators) configured to raise or lower the one or more components of the powertrain relative to the chassis 12 of the vehicle 10. The actuator(s) 110 may be disposed, for example, between the transmission system 22 and a fixed surface 64, and configured to controllably extend and retract to increase and decrease, respectively, a dimension between the transmission system 22 and the fixed surface 64. In this example, only a first end of the powertrain is configured to be raised and lowered. An opposite, second end of the powertrain is coupled to a pivotable joint 112 and configured to pivot relative to the engine mount 64 as the first end is raised or lowered. In this example, the vertical position movement mechanism 23A provided for adjustment of a first angle 60 between an axis 54 of the drive shaft 25 and an axis 56 of the powertrain, and/or adjustment of a second angle 62 between the axis 54 of the drive shaft 25 and an axis 58 of the differential 27.

Referring now to FIGS. 3, 4, 5, and 6, and with continued reference to FIG. 1, a second example of a vertical position movement mechanism 23B is provided. In this example, the vertical position movement mechanism 23B may include a hydraulic system 280 configured to selectively maintain a vertical position of one or more components of the powertrain. With this arrangement, the system 100 is configured to raise and/or lower the one or more components of the powertrain using torque generated by a propulsion system 220.

Figure 3:
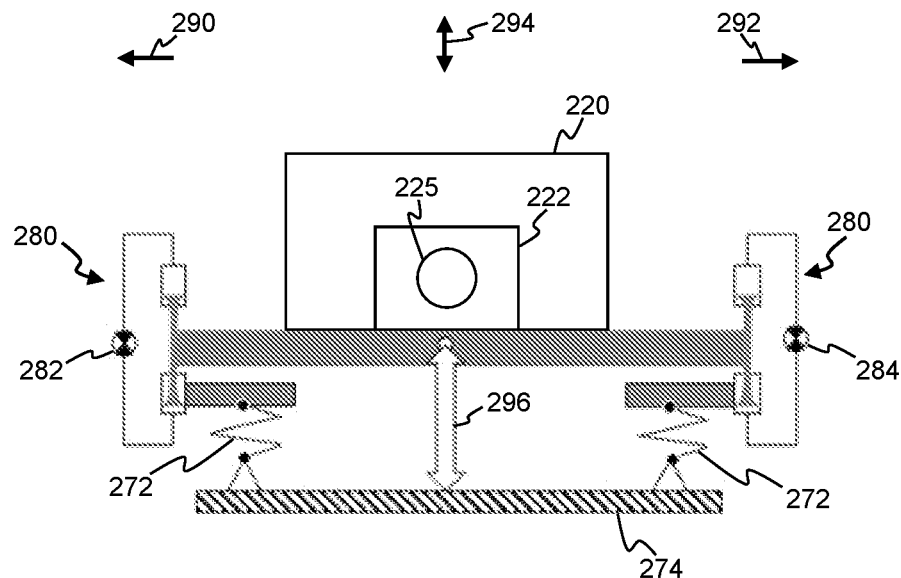
FIGS. 3, 4, 5, and 6 are side views schematically illustrating a method of changing a vertical position of a powertrain with a vertical position movement mechanism in accordance with an example.
Figure 4:
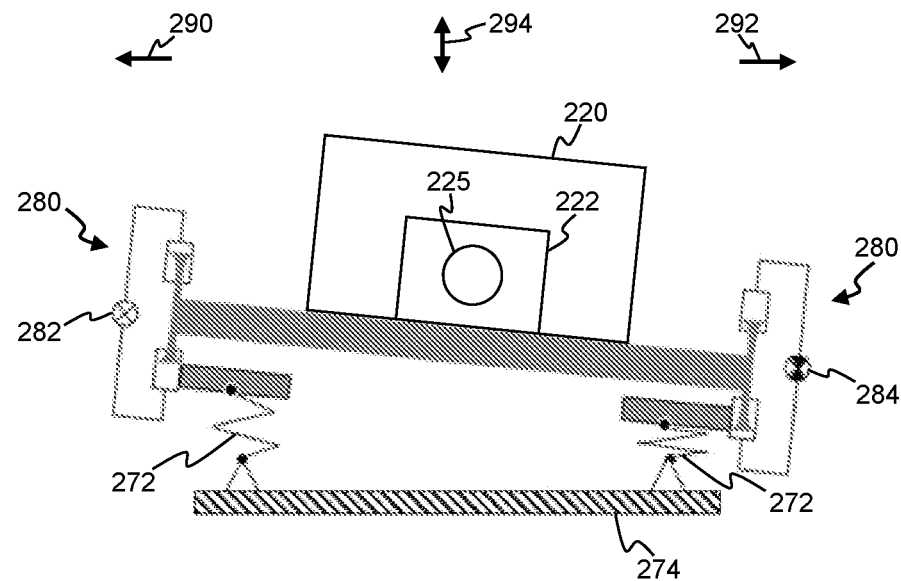
Figure 5:
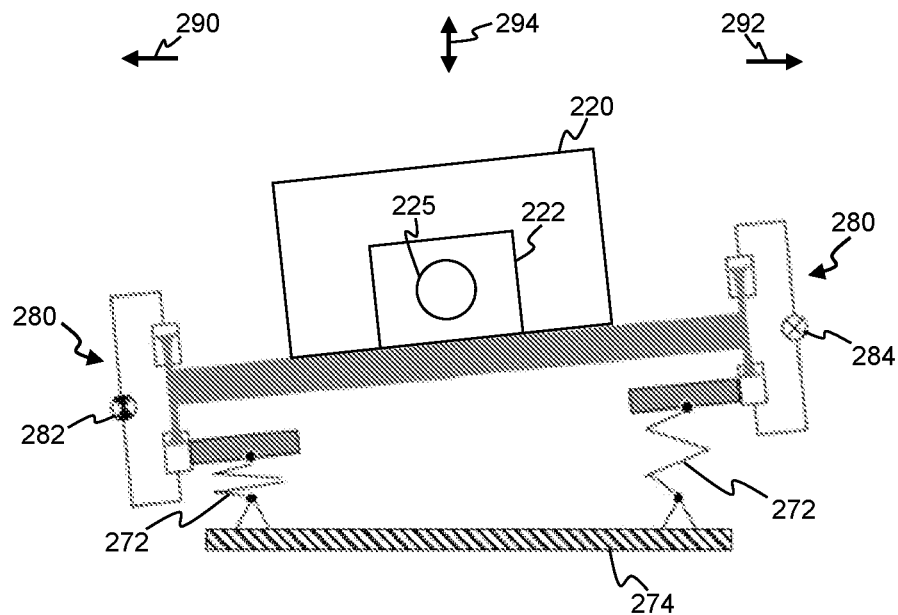
Figure 6:
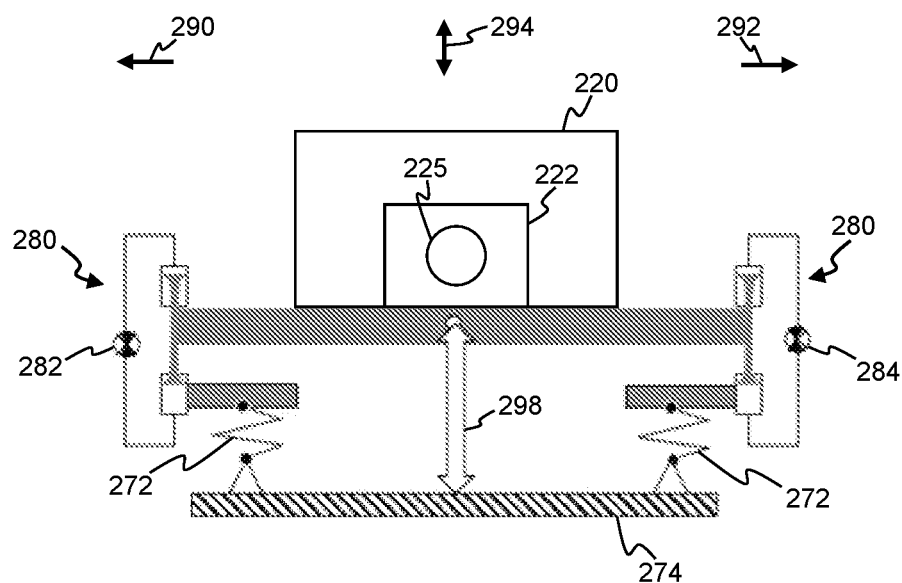

In FIG. 3, a transversely mounted powertrain including the propulsion system 220, a transmission system 222, and a drive shaft 225 is disposed on a support structure 270. The support structure 270 may be disposed on a mounting structure 272, such as a propulsion mount, which in turn is disposed on a fixed structure 274, such as a frame, cradle, body, etc. of a vehicle. A first arrow 290 indicates a forward direction toward a front of the vehicle, a second arrow 292 indicates a rearward direction toward a rear of the vehicle, and a third arrow 294 indicates an up/down direction extending between a top and a bottom of the vehicle. The vertical position of the powertrain may be determined along the up/down direction of the third arrow 294. A fourth arrow 296 indicates a first dimension between the support structure 270 and the fixed structure 274 representing a first vertical position of the powertrain. The powertrain is maintained in this first vertical position with the hydraulic system 280. FIGS. 4-6 illustrate a method of raising the powertrain of FIG. 3.

In FIG. 4, a first valve 282 of the hydraulic system 280 is opened to allow for hydraulic fluid to flow therein and thereby allow for movement of a first, forward end of the powertrain. The propulsion system 220 may be operated to generate a reverse torque sufficient to raise the first, forward end of the powertrain and the first valve 282 may be closed to maintain the first, forward end of the powertrain in a raised position. In FIG. 5, a second valve 284 of the hydraulic system 280 is opened to allow for hydraulic fluid to flow therein and thereby allow for movement of a second, rearward end of the powertrain. The propulsion system 220 may be operated to generate a forward torque sufficient to raise the second, rearward end of the powertrain and the second valve 284 may be closed to maintain the second, rearward end of the powertrain in the raised position. FIG. 6 presents the powertrain as maintained in a second vertical position represented by a fifth arrow 298 that indicates a second dimension between the support structure 270 and the fixed structure 274. The powertrain may be maintained in this second vertical position while the first and second valves 282 and 284 remain closed. To lower the vertical position of the powertrain, one or both of the first and second valves 282 and 284 may be opened such that gravity pulls the powertrain to a lower position. Notably, the hydraulic system 280 may not be limited to maintaining the powertrain in the raised and lower positions, but instead may be configured to maintain the powertrain or components thereof in a plurality of vertical positions.

The example of FIGS. 3-6 may be achieved with various other structures. For example, the hydraulic system 280 may be replaced with a mechanical locking system, such as a pin system, configured to selectively lock one or both ends of the powertrain in two or more vertical positions. In addition, the hydraulic system 280 and/or another locking system may be disposed in another location relative to the other components of the vehicle. For example, the hydraulic system 280 may be disposed between the mounting structure 272 and the fixed structure 274, between the fixed structure 274 and another structure of the vehicle, or in another location as long as the hydraulic system 280 is capable of securing the vertical position of the powertrain.

Figure 7:
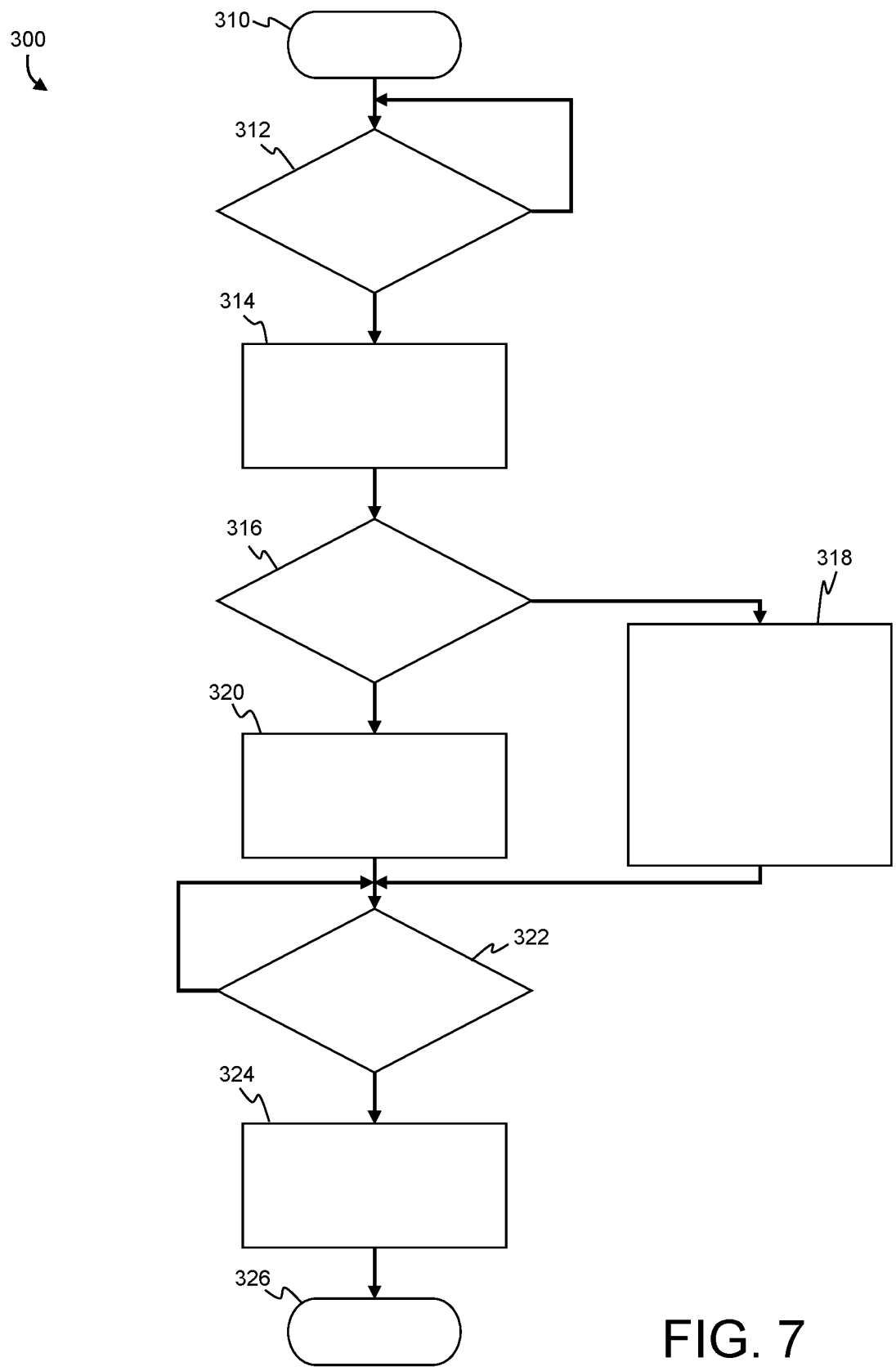
FIG. 7 is a flowchart illustrating a method of adjusting drive shaft angles of a vehicle based on an active vehicle mode in accordance with an example.

With reference now to FIG. 7 and with continued reference to FIGS. 1-6, a flowchart provides a method 300 for adjusting drive shaft angles based on an active vehicle mode, for example, as performed by the system 100, in accordance with various examples. As can be appreciated in light of the disclosure, the order of operation within the method 300 is not limited to the sequential execution as illustrated in FIG. 7, but may be performed in one or more varying orders as applicable and in accordance with the present disclosure. In various examples, the method 300 can be scheduled to run based on one or more predetermined events, and/or can run continuously during operation of the vehicle.

In one example, the method 300 may start at 310. At 312, the method 300 may include determining whether a vehicle mode is active or if the vehicle is entering a vehicle mode that requires a change to the drive shaft angle (or first and second angles of the joints thereof). For example, a controller (e.g., the controller 34) may determine that a lifted vehicle mode is active and that the powertrain should be raised to adjust the drive shaft angle. If the vehicle is not in or entering a vehicle mode that requires a change to the drive shaft angle, the method 300 continues to monitor the vehicle mode status. If the vehicle is in or entering a vehicle mode that requires a change to the drive shaft angle, the method continues to 314.

At 314, the method 300 may include raising or lowering one or more components of the powertrain with the vertical position movement mechanism to achieve the desired drive shaft angle. At 316, the method 300 may optionally include determining whether the powertrain is disposed in the proper vertical position, for example, based on signals received from a position sensor of the powertrain. This step 316 may optionally be used to identify software faults and/or component failures in the system. If the powertrain is not in the proper vertical position at 316, the method 300 may include, at 318, locking the powertrain in the current vertical position, exiting the current vehicle mode that necessitated the change in vertical position of the powertrain, and/or remain in the vehicle mode and impose speed restrictions on operation of the vehicle based on the vehicle mode. As used herein, the term "locking" refers to maintaining the nominal vertical position of the powertrain. If the powertrain is in the proper position at 316, the method 300 may continue to 320.

At 320, the method 300 may include locking the vertical position of the powertrain. At 322, the method 300 may include monitoring the active vehicle mode to detect when the vehicle exits the current vehicle mode, thereby requiring another change to the drive shaft angle, for example, to the original angle. If the vehicle mode is not changed at 322, the method 300 continues to monitor the active vehicle mode. If the vehicle exits the current vehicle mode at 322, the method may continue to 324. At 324, the method 300 may include raising or lowering one or more components of the powertrain with the vertical position movement mechanism to achieve a new, desired drive shaft angle, such as the original drive shaft angle. The method 300 may end at 326.

Figure 8:
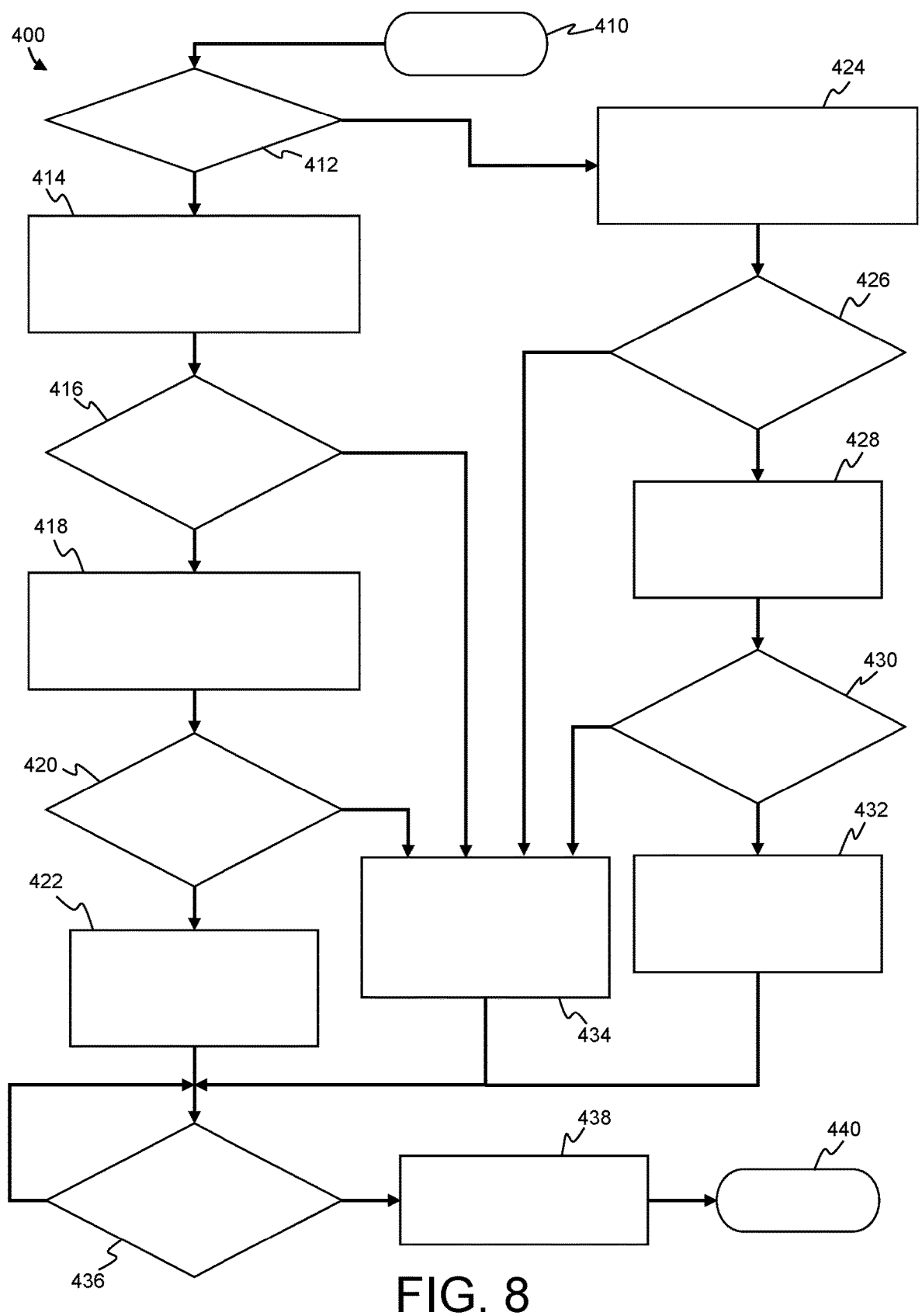
FIG. 8 is a flowchart illustrating a method of modifying a vertical position of a powertrain of a vehicle using torque generated by the powertrain in accordance with an example.

With reference now to FIG. 8 and with continued reference to FIGS. 1-7, a flowchart provides a method 400 for modifying the vertical position of a powertrain of a vehicle using torque generated by the powertrain, for example, as performed by the system 100 and/or the vertical position movement mechanism 23B, in accordance with various examples.

The method 400 may start at 410. At 412, the method 400 may include determining whether the transmission system of the vehicle is in "park." If the vehicle is in "park," the method 400 may include, at 414, unlocking at least a first portion of one or more components of the powertrain, locking all brakes of the vehicle, and generating a torque with the propulsion system of the vehicle to raise at least the first portion of the powertrain. If the first portion of the powertrain is in the raised vertical position at 416, the method 400 continues at 418 by locking the first portion of the powertrain in the raised vertical position, unlocking a second portion of the one or more components of the power train (if not previously unlocked), and generating a torque with the propulsion system in an opposite direction to raise the second portion of the powertrain. If the second portion of the powertrain is in the raised vertical position at 420, the method 400 may continue to 422 by locking the vertical position of the second portion, and releasing the brakes.

If the vehicle is not in "park" at 412, the method 400 may continue at 424 by maintaining any previously imposed speed restrictions, and unlocking all or a portion of one or more components of the powertrain. In some examples, the method 400 may generate a user notification instructing the user to place the vehicle in "park" to complete the powertrain height adjustment sequence. If the user transitions the vehicle into 'park," the method 400 may return to 412. If the vehicle is continued to be operated in, for example, "drive" or "reverse," the method 400 may continue to 426 by monitoring the vertical position of the powertrain. Since the powertrain or a portion thereof is unlocked, the normal operation of the vehicle may apply torque to the powertrain sufficient to raise all or the portion of the powertrain to the raised vertical position. At 426, the method 400 may include monitoring the vertical position of the first portion of the powertrain. If the first portion of the powertrain is raised, the method 400 may continue at 428 by locking the first portion. At 430, the method 400 may include monitoring the vertical position of the second portion of the powertrain. If the second portion of the powertrain is raised, the method 400 may continue at 432 by locking the second portion.

If the powertrain or portions thereof do not raise at steps 416, 420, 426, and/or 430 within a predetermined time period, the method 400 may include, at 434, generating an error notification, ending the height adjustment sequence, and/or locking the vertical position of the powertrain.

At 436, the method 400 may include monitoring the vertical position of the powertrain of components thereof. If at 436, the powertrain is not in the raised vertical position as intended, the method 400 may continue to monitor the vertical position of the powertrain of components thereof. If at 436, the powertrain is in the raised vertical position as intended, the method 400 may continue at 438 by lifting any previously imposed speed limitations and allowing the vehicle to be operated within normal drive speed limits in accordance with, for example, the active vehicle mode. The method 400 may end at 440.

The systems and methods disclosed herein provide various benefits over certain existing systems and methods. For example, the systems and methods disclosed herein provide for modifying the vertical position of the powertrain and thereby adjusting one or more angles associated with the drive shaft. This capability can be used to modify the performance of the vehicle, extend the operating lifespan of various components of the vehicle, and/or reduce noise and/or vibrations produced during operation of the vehicle. In some examples, the systems and methods disclosed herein may be used to extend an operating angle range of a drive shaft and the joints at ends thereof. In some examples, this capability may allow for use of other types of joints, for example, use of universal joints rather than constant velocity joints.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:
   modifying, with a vertical position movement mechanism of a vehicle, a vertical position of a powertrain or component thereof of the vehicle between a top and a bottom of the vehicle to adjust a first angle of a first joint at a first end of a drive shaft of the vehicle, wherein the drive shaft functionally couples the powertrain and wheels of the vehicle to transfer rotational power from the powertrain to the wheels, wherein modifying the vertical position of the powertrain or the component thereof includes:
   producing torque with the powertrain to raise or lower at least a portion of the powertrain or the component thereof; and
   maintaining the vertical position of at least the portion of the powertrain or the component thereof with a hydraulic system of the vehicle.

2. The method of claim 1, wherein modifying the vertical position of the powertrain or the component thereof is performed to reduce a difference between a first absolute value of the first angle of the first joint and a second absolute value of a second angle of a second joint at a second end of the drive shaft.

3. The method of claim 1, wherein the vehicle is configured to selectively operate in a first vehicle mode having a first baseline angle of the first joint or a second vehicle mode having a second baseline angle of the first joint, wherein modifying the vertical position of the powertrain or the component thereof is performed to adjust the first angle between the first baseline angle and the second baseline angle.

4. The method of claim 1, further comprising operating, by a controller of the vehicle having one or more processors, the vertical position movement mechanism to automatically adjust the vertical position of the powertrain or the component thereof to accommodate for variations in positions of the wheels during propulsion of the vehicle.

5. The method of claim 1, further comprising:
   determining, by a controller of the vehicle having one or more processors, a difference in a first absolute value of the first angle of the first joint and a second absolute value of a second angle of a second joint at a second end of the drive shaft; and
   operating, by the controller with the one or more processors, the vertical position movement mechanism to automatically adjust the vertical position of the powertrain or the component thereof to reduce the difference between the first absolute value and the second absolute value.

6. The method of claim 1, wherein modifying the vertical position of the powertrain or the component thereof includes raising or lowering the first end of the powertrain of the component thereof, wherein a second end of the powertrain or the component thereof is pivotally coupled to the vehicle and configured to pivot in response the first end raising or lowering.

7. A system for a vehicle, comprising:
   a vertical position movement mechanism configured to selectively maintain a vertical position of a powertrain or a component thereof of the vehicle relative to a chassis of the vehicle, wherein the vertical position movement mechanism includes a hydraulic system; and
   a controller configured to, by one or more processors, modify the vertical position of the powertrain or the component thereof between a top and a bottom of the chassis with the vertical position movement mechanism to controllably adjust a first angle of a first joint at a first end of a drive shaft of the vehicle, wherein the drive shaft functionally couples the powertrain and wheels of the vehicle to transfer rotational power from the powertrain to the wheels,
   wherein the controller is configured to, by the one or more processors, produce torque with the powertrain to raise or lower the powertrain or the component thereof and maintain the vertical position of the powertrain or the component thereof with the hydraulic system.

8. The system of claim 7, wherein the controller is configured to, by the one or more processors, modify the vertical position of the powertrain or the component thereof to reduce a difference between a first absolute value of the first angle of the first joint and a second absolute value of a second angle of a second joint at a second end of the drive shaft.

9. The system of claim 7, wherein the vehicle is configured to selectively operate in a first vehicle mode having a first baseline angle of the first joint or a second vehicle mode having a second baseline angle of the first joint, wherein the controller is configured to, by the one or more processors, modify the vertical position of the powertrain or the component thereof to adjust the first angle between the first baseline angle and the second baseline angle.

10. The system of claim 7, wherein the controller is configured to, by the one or more processors, operate the vertical position movement mechanism to automatically adjust the vertical position of the powertrain or the component thereof to accommodate for variations in positions of the wheels during propulsion of the vehicle.

11. The system of claim 7, wherein the controller is configured to, by the one or more processors:
   determine a difference in a first absolute value of the first angle of the first joint and a second absolute value of a second angle of a second joint at a second end of the drive shaft; and
   operate the vertical position movement mechanism to automatically adjust the vertical position of the powertrain or the component thereof to reduce the difference between the first absolute value and the second absolute value.

12. The system of claim 7, wherein the vertical position movement mechanism is configured to raise or lower the first end of the powertrain or the component thereof, wherein a second end of the powertrain or the component thereof is pivotable relative to the chassis and configured to pivot in response the first end raising or lowering.

13. The system of claim 7, wherein the controller is configured to, by the one or more processors, modify the vertical position of the powertrain or the component thereof by:
opening at least one valve of the hydraulic system to allow hydraulic fluid to flow therein and thereby allow for movement of the powertrain or the component thereof;
produce torque with the powertrain to raise the powertrain or the component thereof when raising the powertrain;
allow gravity to pull the powertrain lower when lowering the powertrain; and
close the at least one valve to cease flow of the hydraulic fluid therein and thereby maintain the vertical position of the powertrain or the component thereof.

14. The system of claim 13, wherein the hydraulic system includes a first valve at a forward end of the powertrain and a second valve at a rearward end of the powertrain, wherein the controller is configured to, by the one or more processors, open the first valve to raise or lower the forward end of the powertrain and open the second valve to raise or lower the rearward end of the powertrain.

15. A vehicle, comprising:
a chassis;
wheels;
a suspension system coupling the wheels to the chassis and configured to provide for relative movement between the wheels and the chassis;
a powertrain secured to the chassis and configured to generate rotational power;
a drive shaft functionally coupling the powertrain and the wheels and configured to transmit the rotational power from the powertrain to the wheels to rotate the wheels and thereby propel the vehicle, wherein the drive shaft is functionally coupled to the powertrain with a first joint and to the wheels with a second joint, wherein the first joint and the second joint are configured to accommodate for changes in angle and alignment between the powertrain and the wheels or intermediate components therebetween to provide for continuous transfer of the rotational power from the powertrain to the wheels despite variations in vertical positions of the wheels relative to the powertrain;
a vertical position movement mechanism configured to selectively maintain a vertical position of the powertrain or a component thereof relative to the chassis, wherein the vertical position movement mechanism includes a hydraulic system; and
a controller configured to, by one or more processors, modify the vertical position of the powertrain or the component thereof between a top and a bottom of the chassis with the vertical position movement mechanism to controllably adjust a first angle of the first joint of the drive shaft, wherein the controller is configured to, by the one or more processors, produce torque with the powertrain to raise or lower the powertrain or the component thereof and maintaining the vertical position of the powertrain or the component thereof with the hydraulic system.

16. The vehicle of claim 15, wherein the vehicle is configured to selectively operate in a first vehicle mode having a first baseline angle of the first joint or a second vehicle mode having a second baseline angle of the first joint, wherein the controller is configured to, by the one or more processors, modify the vertical position of the powertrain or the component thereof to adjust the first angle between the first baseline angle and the second baseline angle.

17. The method of claim 1, wherein modifying the vertical position of the powertrain or the component thereof includes:
opening at least one valve of the hydraulic system to allow hydraulic fluid to flow therein and thereby allow for movement of the powertrain or the component thereof;
producing torque with the powertrain to raise the portion of the powertrain or the component thereof when raising the portion of the powertrain;
allowing gravity to pull the portion lower when lowering the portion of the powertrain; and
closing the at least one valve to cease flow of the hydraulic fluid therein and thereby maintain the vertical position of the portion of the powertrain or the component thereof.

18. The method of claim 17, wherein the hydraulic system includes a first valve at a forward end of the powertrain and a second valve at a rearward end of the powertrain, wherein opening the at least one valve of the hydraulic system to allow hydraulic fluid to flow therein includes opening the first valve to raise or lower the forward end of the powertrain and opening the second valve to raise or lower the rearward end of the powertrain.

19. The vehicle of claim 15, wherein the controller is configured to, by the one or more processors, modify the vertical position of the powertrain or the component thereof by:
opening at least one valve of the hydraulic system to allow hydraulic fluid to flow therein and thereby allow for movement of the powertrain or the component thereof;
produce torque with the powertrain to raise the powertrain or the component thereof when raising the powertrain;
allow gravity to pull the powertrain lower when lowering the powertrain; and
close the at least one valve to cease flow of the hydraulic fluid therein and thereby maintain the vertical position of the powertrain or the component thereof.

20. The vehicle of claim 19, wherein the hydraulic system includes a first valve at a forward end of the powertrain and a second valve at a rearward end of the powertrain, wherein the controller is configured to, by the one or more processors, open the first valve to raise or lower the forward end of the powertrain and open the second valve to raise or lower the rearward end of the powertrain.

* * * * *